Oct. 20, 1970

N. L. D'ERI 3,534,617

GYROSCOPE ARRANGEMENT

Filed Nov. 1, 1968

INVENTOR,
NICHOLAS L. D'ERI

By: Harry M. Saragovitz, Edward J. Kelly, Herbert Berl & S. Dubroff

ATTORNEYS.

United States Patent Office 3,534,617

Patented Oct. 20, 1970

3,534,617

GYROSCOPE ARRANGEMENT

Nicholas L. D'Eri, Hillsborough, N.H., assignor to the United States of America as represented by the Secretary of the Army Filed Nov. 1, 1968, Ser. No. 772,604

Int. Cl. G01c *19/26*

U.S. Cl. 74—5.1 2 Claims

ABSTRACT OF THE DISCLOSURE

A fluid operated gyroscope having a latching mechanism which automatically latches and unlatches the gyroscope output gimbal in response to a differential in pressure between two chambers, the pressure differential being caused by exhaustion of fluid from the chambers upon gyroscope actuation.

The invention described herein may be manufactured, used, and licensed by or for the Government for governmental purposes without the payment to me of any royalty thereon.

This invention relates to a fluid operated, gyroscopic device. In particular, it relates to a mechanism for automatically unlatching and latching a gyroscope output gimbal within such a device.

The technology of recent years has expanded the application of gyroscopes to devices which play in important part in space exploration and defense systems. Today, gyroscopes have become an invaluable tool in the safing and fuzing of military projectiles.

A fluid operated gyroscope is that type which utilizes a fluid to maintain the angular velocity of its rotor. Devices of this type are commonly constructed having two chambers. One chamber is for the storage of a fluid supply; the other is for conversion of fluid potential energy. Generally, this is accomplished by increasing the velocity of the fluid in the rotor chamber and having it tangentially impinge upon the rotor blades.

If a pressurized gas is used as the rotor velocity sustaining fluid, any accidental leakage of gas through the rotor chamber will cause the rotor to spin. Under certain conditions this can cause output gimbal precession. It is obvious then, that an unsafe situation is presented if this type of device were used to detonate a missile upon a predetermined amount of output gimbal precession.

To preclude any possibility of accidental gimbal movement, the gimbal must be maintained locked (caged) at all times except when intentional gimbal precession is required (uncaged condition). Thereafter, the gimbal must be restored to its caged mode.

The testing of this type gyroscope has also presented vexing problems. For example, if the caging and uncaging functions were not completely automatic then each time a test were conducted the gyroscope would either be dismantled for manual caging, or special tools would have to be used. Presently this latching is accomplished by the use of special tools and intricate procedures and is accompanied with the time delays associated with such latching methods.

The latching and unlatching of gyroscope gimbals is commonly referred to as caging and uncaging in gyroscope art.

It is, therefore, an object of this invention to provide a mechanism which will automatically uncage and cage the output gimbal of a fluid gyroscope upon the occurence of a predetermined condition.

This invention will be better understood from the following description taken in connection with the accompanying drawings in which:

FIG. 2 is an enlarged sectional view of the pressure sensing device used in the FIG. 1 arrangement.

Figure 1:
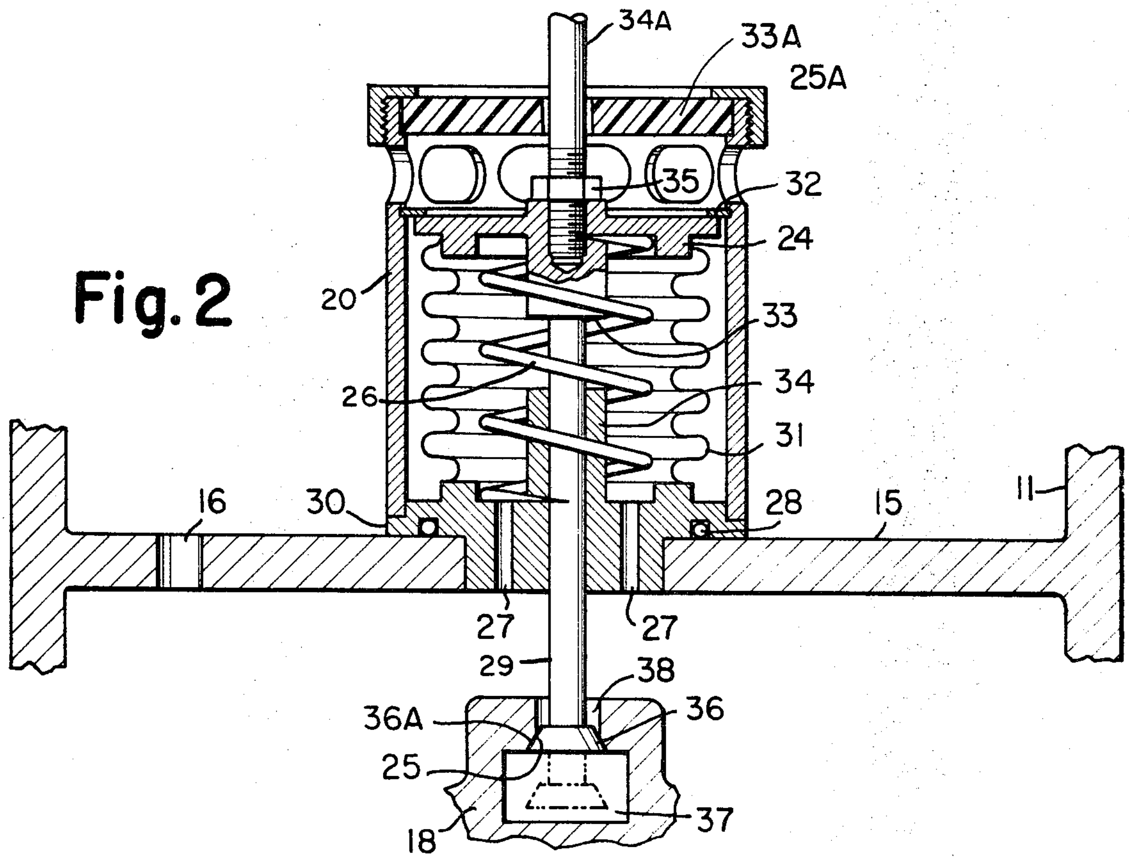
FIG. 1 is a sectional view of a fluid operated gyroscope arrangement embodying the principles of the invention.
Figure 1:
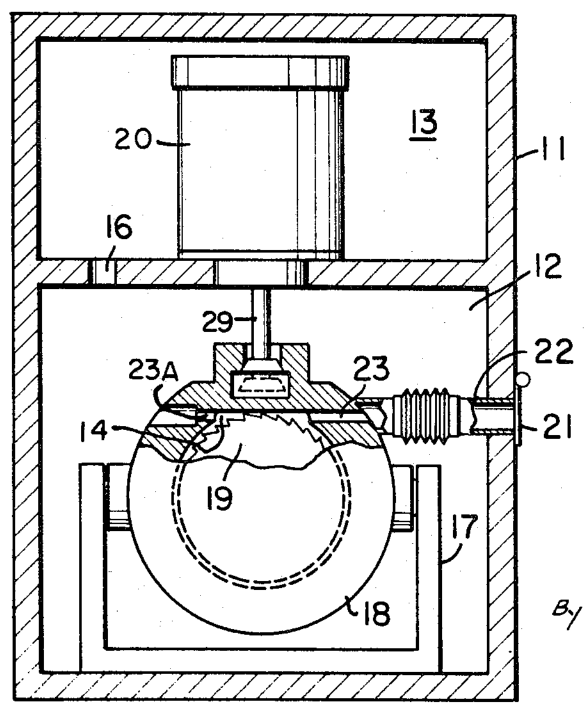

The housing 11 (FIG. 1) of the rate sensing device is securely attached to the object whose roll rate about axis A—A is to be measured. The case is hermetically sealed and preferably made from metal, although other material may be substituted so long as it is able to withstand the developed internal gas pressures. Internal chambers 12 and 13, defined by an internal, horizontally extending partitioning wall 15, represent a gyroscope housing chamber and a fluid storage chamber, respectively, and the rotor acceleration chamber 14 is located within the output gimbal 18. The partition 15 has a through passage or metering orifice 16, to provide a path for regulated fluid flow between chambers 12 and 13.

Gimbal support 17 is securely attached to housing 11 in an appropriate manner to provide an orthogonal axis B—B for rotation of output gimbal 18. One end of a flexible tube 22 is securely fastened to output gimbal 18, and the other end to a gas exhaust valve 21 located in the housing wall 11. The tubing is also axially aligned with rotor chamber exhaust port 23 and must be of sufficient length and flexibility so as not to impair the free rotation of output gimbal 18.

Completely inclosed within the output gimbal and tangential to rotor chamber inlet port 23A is rotor 19. Output gimbal 18 is shaped to provide a surface 25 (FIG. 2) for contacting surface 36A on flared link end 36. Frictional forces created by contact between these surfaces are sufficient to cage the output gimbal in the desired position of its oscillatory motion. Clearance space 37 is provided to insure free movement of link 29 to the extremity of its downward position as limited by shoulder 34.

Not shown in FIG. 2 but integral with gimbal 18 is a suitable slot for assembly of flared link end 36 into operable position within gimbal 18. Slot 38, through which link 29 passes, is located along the periphery of gimbal 18 and provides space for the oscillation of gimbal 18.

Opposite the flared or frustrum-like enlarged head on link 29, and threadedly or otherwise connected to the link is piston 24 (FIG. 2). Integral with the piston and for the purposes of limiting piston travel is a downwardly facing shoulder 33. Base 30 is centrally apertured to slidingly or freely receive link 29 and is constructed so as to project upwardly facing shoulder 34 co-axially with link 29. Shoulder 34 is of such length with respect to base 30 as to contact shoulder 33 on link 34A after a predetermined amount of piston travel.

Base 30 has a radial groove for seating seal 28, and a plurality of breather orifices 27 that render the interior of bellows 31 in fluid communication with gyroscope housing chamber 12. Bellows 31 is securely fastened and seated to base 30, and piston 24. In the interior of said bellows a suitable compression spring 26 is disposed between the stationary base 30 and the upward biased piston 24 and is maintained under slight initial compression by an overlying piston retaining ring 32 that is appropriately seated in internal grooves of cylinder wall 20.

Cylinder 20 is suitably secured to base 30 and has a plurality of peripherally spaced ports in its sidewall above the retaining ring grooves. An auxiliary linkage bearing plate 33A, through which passes an auxiliary link 34A that is secured to piston 24 by means of screw threads and nut 35, is secured in an internal cylinder seat by a ring-like piston retaining cover 25A that is threadedly secured to the cylinder upper end.

In the operation of the arrangement an initial charge of fluid, preferably pressurized gas, is placed in chamber 13. By virtue of fluid metering orifice 16, and breather orifice 27, the pressurized gas within chamber 13, is distributed throughout chambers 12, 14 and the interior of bellows 31. With the initial pressure forces on both surfaces of piston 24 being substantially equal, piston spring 26 is of predetermined characteristics to urge or bias piston 24 upwardly against retaining ring 32, as shown in FIG. 2.

Surface 36A of connecting link enlargement 36 is normally maintained in engagement with output gimbal surface 25 by virtue of the spring biased position of piston 24 and link 29.

The opening of fluid exhaust valve 21, will cause gas to flow through rotor acceleration chamber 14. This flow of gas will impinge upon the vanes of rotor 19, to accelerate and maintain it at a desired velocity. Flow through chamber 14, will cause the pressure in chamber 12 to drop below the pressure in chamber 13, causing piston 24 to move downwardly to compress spring 26 and move link 29 a sufficient distance to disengage flared surface 36A from output gimbal surface 25.

An increase in pressure differential will cause further movement of piston and connecting link with the base shoulder or stop means 34 limiting the downward motion of the link shoulder 33.

As the pressure differential decreases, with the exhaustion of gas stored within chamber 13, spring 26 will return toward its uncompressed condition. This will move flared surface surface 36A of line end 36 into proximity with gimbal surface 25. As the pressure in chamber 13 further decreased to zero, the flared surface will contact the gimbal surface and cage the output gimbal.

Associated with the movement of piston 14 is the movement of auxiliary link 34A. This link may be used to perform switching or other operations at various stages of uncaging.

Various modifications, changes, or alterations may be resorted to without departing from the scope of the invention as defined in the appended claims.

I claim:

1. A fluid operated gyroscopic device comprising:

a sealed housing, a partitioning wall within said housing and defining therewithin a fluid chamber and gyroscope housing chamber, said wall having a metering orifice for fluidly communicating with said chambers, said gyroscope housing chamber having a fluid outlet port, an output gimbal in said gyroscope housing chamber, means supporting said gimbal for rotation about an axis, a rotor within said gimbal and defining therebetween a rotor acceleration chamber, impellor means on said rotor for imparting rotary motion thereto, a flexible exhaust tube connecting said output gimbal and said outlet port, passage means in said output gimbal for fluidly communicating both said gyroscope housing chamber and said flexible tube, and caging means supported by said partitioning wall for latching and unlatching said output gimbal, said caging means including a rigid link and pressure sensing means, one end of said rigid link being securely connected to said pressure sensing means and the other end of said link releasably connected to said output gimbal, said link having a flanged enlargement on said other end and said output gimbal having a peripheral slot portion receiving said link and an arcuate chamber portion within said gimbal for receiving said enlargement, said slot and arcuate chamber portions intersecting and defining an arcuately extending internal seat surface for frictionally engaging a surface portion of said link end.

2. The structure in accordance with claim 1, wherein said pressure sensing means, the exterior of which is exposed to said fluid storage chamber, comprises a spring biased bellows and passage means in fluid communication with said gyroscope housing chamber and said bellows interior.

References Cited

UNITED STATES PATENTS

| | | | |
|---|---|---|---|
| 1,996,896 | 4/1935 | Bennett | 74—5.14 XR |
| 2,273,309 | 2/1942 | Zand | 74—5.14 |
| 3,086,400 | 4/1963 | Barnes | 74—5.7 |
| 3,267,748 | 8/1966 | Conklin | 74—5.12 |

MANUEL A. ANTONAKAS, Primary Examiner

U.S. Cl. X.R.

74—5.7